United States Patent
Gonzaga

[11] Patent Number: 5,806,578
[45] Date of Patent: Sep. 15, 1998

[54] MANUAL TIRE BEAD BREAKING LEVER

[75] Inventor: Tullio Gonzaga, Correggio, Italy

[73] Assignee: Butler Engineering & Marketing S.r.l., Rio Saliceto, Italy

[21] Appl. No.: 674,035

[22] Filed: Jul. 1, 1996

[30] Foreign Application Priority Data

Jul. 4, 1995 [IT] Italy ................................ VR950037 U

[51] Int. Cl.$^6$ ................................................. B60C 25/04
[52] U.S. Cl. ............................................................. 157/1.3
[58] Field of Search .............................. 157/1.3; 254/120, 254/131

[56] References Cited

U.S. PATENT DOCUMENTS

| 2,634,803 | 4/1953 | Obee | 157/1.3 |
| 5,343,921 | 9/1994 | Kusner | 157/1.3 |

FOREIGN PATENT DOCUMENTS

| 504006 | 9/1919 | France | 157/1.3 |
| 566185 | 3/1923 | France | 157/1.3 |

Primary Examiner—James G. Smith
Attorney, Agent, or Firm—Guido Modiano; Albert Josif

[57] ABSTRACT

A bead lifting lever having a curved body that ends with at least one tip provided with a rounded and expanded tip edge.

7 Claims, 4 Drawing Sheets

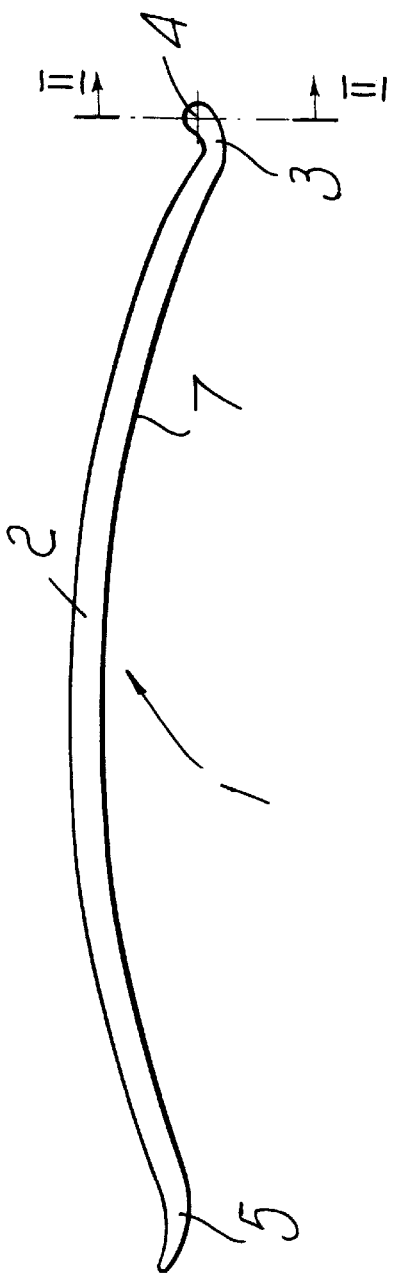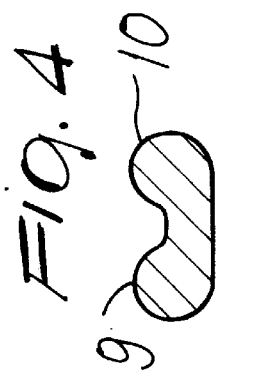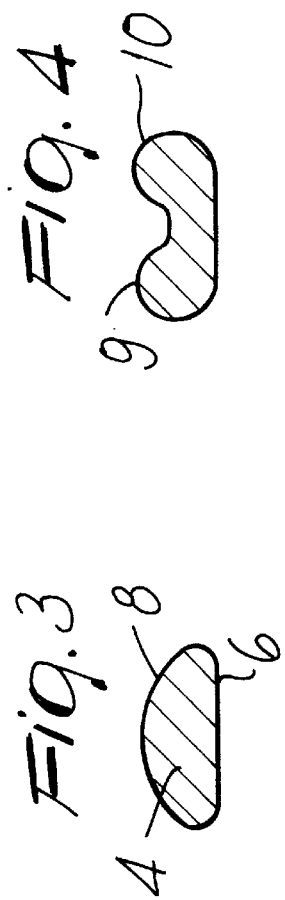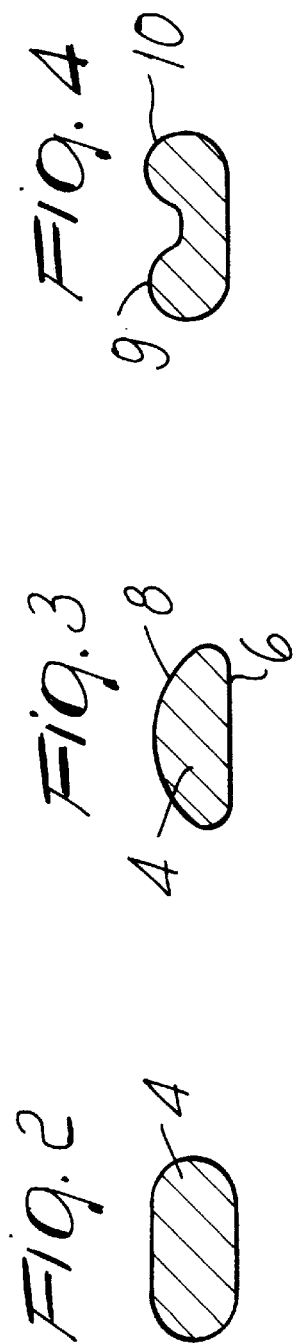

MANUAL TIRE BEAD BREAKING LEVER

BACKGROUND OF THE INVENTION

The present invention relates to a manual tire bead breaking lever, particularly to be used by resting on a tool of a tire removing machine.

Rod-like bead breaking levers having tapered and slightly curved and rounded ends have already long been proposed and have become rather widespread, but all have severe drawbacks.

The first drawback resides in the fact that since the lever has tapered ends, when the operator, after inserting the lever by making it slide on an appropriate tab of the tool of the tire removing machine under one of the beads, especially the inner one, lifts the bead by using the tool of the tire removing machine as a fulcrum, an incision is produced in the wall of the tire because the tip of the bead breaking lever penetrates the internal surface of the tire (in the case of the outer bead), thus compromising the continuity and integrity of the internal coating of the tire, or the external surface of the tire (if acting on the inner bead).

A second drawback is the fact that since the lever has a generally flat but straight rod-like body, when the operator tries to reach the inner bead by passing under the outer one adjacent to the tool of the tire removing machine, he can keep the lever in the correct position, so that its lower tip enters between the wheel rim and the inner bead to then perform lifting, only with difficulty and at the cost of applying a considerable manual effort; this compromises the airtightness of the tire, which in the case of a tubeless tire becomes unusable. This occurs because the inner bead, after the lifting of the outer bead and due to the presence of the tool inserted on the outer edge of the wheel rim, is in an offset position, generally further backward than the lifted outer bead.

Another drawback of the above-described conventional bead breaking levers is the fact that the tapered and smooth ends, despite being curved, are unable to develop a sufficient bead retention force; therefore, during lifting, when the fulcrum is located on the tool of the tire removing machine, the bead often slips off the lever, in which case it is necessary to repeat the operation from scratch.

An additional drawback furthermore occurs with light alloy wheels of the "soft" type, which are becoming increasingly widespread and have a spoke region the lateral extension whereof is greater than that of the actual wheel rim. With these wheels, during completion of the breaking of either of the beads, the lever inevitably rests on the spokes of the wheel, sliding thereon and creating visible scrape marks or otherwise damaging them on their surface.

SUMMARY OF THE INVENTION

A principal aim of the present invention is to provide a bead breaking lever that is capable of eliminating or drastically reducing the drawbacks observed above with reference to conventional levers.

An object of the present invention is to provide a bead breaking lever that does not damage the tire in any operating position, is effective and very practical in use, and has a competitive manufacturing cost.

This aim, this object, and others which will become apparent hereinafter are achieved by a bead breaking lever according to the invention, comprising a curved body and ending with at least one tip that is provided with a rounded and expanded tip edge.

Advantageously, the or each expanded tip can have a pair of expansions.

BRIEF DESCRIPTION OF THE DRAWINGS

The invention is further described hereinafter with reference to the accompanying drawings, wherein:

FIG. 1 is a lateral elevation view of a curved bead lifting lever according to the invention;

FIG. 2 is a sectional view, taken along the plane II—II of FIG. 1;

FIG. 3 is a sectional view, similar to FIG. 2, but according to a different embodiment;

FIG. 4 is a sectional view, similar to FIG. 2, but according to a further constructive embodiment;

DESCRIPTION OF THE PREFERRED EMBODIMENTS

Figure 5:
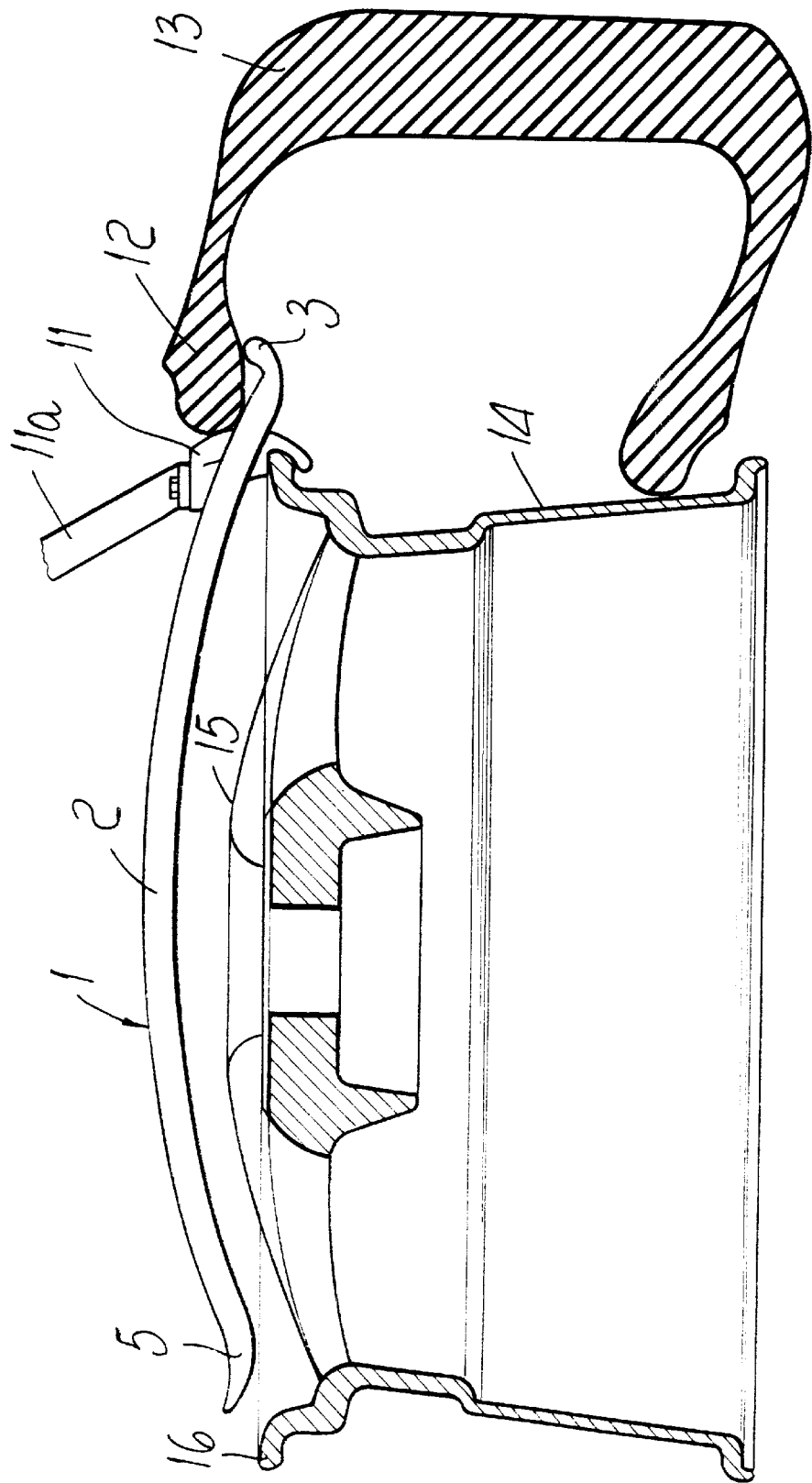
FIG. 5 is a diametrical sectional view of an ultralight alloy wheel with a bead breaking lever according to the invention, fully pushed down against the wheel at the end of the lifting of the outer bead of a tire.
Figure 6:
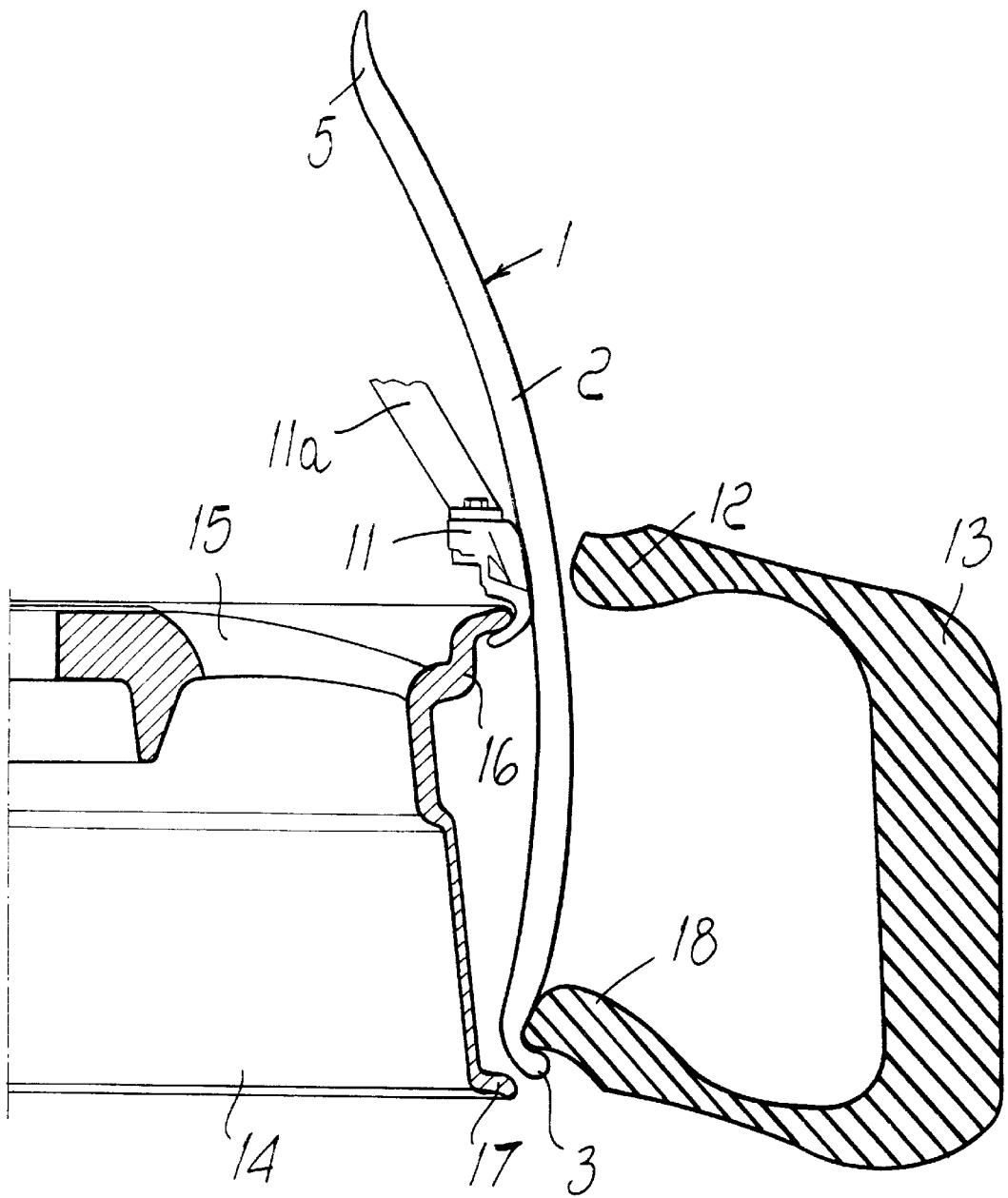
FIG. 6 is a view of the position for the complete insertion of a bead breaking lever according to the invention, engaged with the inner bead of a tire and rested on the tool of a tire removing machine.

With reference to the above figures, a bead breaking lever according to the invention, generally designated by the reference numeral 1, is formed by a curved rod-like body 2 that is preferably flat with rounded edges and is made of a rigid material, such as steel, light alloy, composite materials reinforced with fibers, such as for example glass fibers, carbon fibers, and the like, that ends with curved tips in which the curvature is orientated in the opposite direction with respect to the curvature of the body of the lever. One of the tips, designated by the reference numeral 3, has a rounded and expanded transverse tip edge 4, whereas the other tip, designated by the reference numeral 5, can have a profile that tapers towards the end and has a curvature the radius whereof is much greater than that of the tip 3, typically 10–20 times greater as regards the curvature radii that are adjacent to the convex part of the body 2 and 2–5 times greater for those on the opposite face.

The edge 4 can be constituted by a simple rounded expansion, as shown in FIG. 2, or can have a flat surface 6 as a continuation of the concave inner surface 7 of the curved body 2 and a laterally radiused convex surface 8 on the opposite side, as shown in FIG. 3.

For the sake of lightening and practicality, the curved and expanded tip 3 can also have a pair of rounded expansions 9 and 10, as shown in FIG. 4.

By way of example, the curved body 2 can have a camber of typically 15–30 mm over a projected length of approximately 480–500 mm.

With a bead breaking lever having this structure, by inserting the expanded tip 3 between the tool 11 supported at the lower end of a suspended arm 11a of a tire removing machine and the outer bead 12 of a tire 13 mounted on an ultralight alloy wheel 14 fitted on the tire removing machine—see FIG. 5—a good grip is achieved between the expanded edge 4 or 9 and 10 and the inner part of the bead, and there is no risk that the lever, during insertion and especially during the lifting effort, when the fulcrum is located on the tool 11, might penetrate, score, or cut the inner surface of the tire 13.

Once the lever has been overturned adjacent to the front face of the wheel 14, by virtue of its curvature it does not touch the spoke region 15, which protrudes slightly from the plane of arrangement of the outer edge 16 of the wheel; therefore, there is no danger of damaging the spokes or the rim 16 of the wheel, since the tip 5 of the lever 1 is held in the operator's hand.

Figure 7:
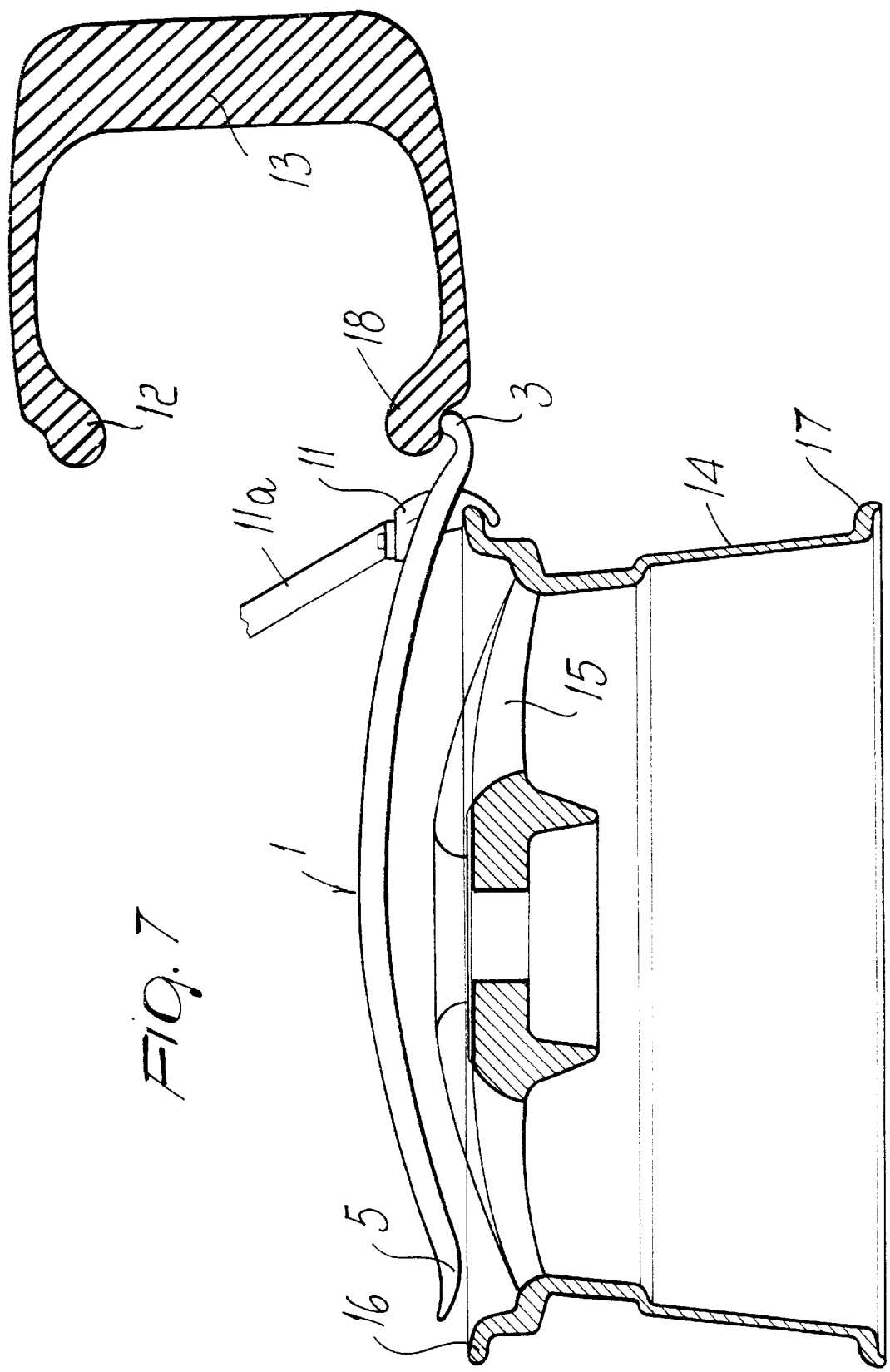
FIG. 7 is a view, similar to FIG. 5, but with the bead breaking lever engaged with the inner bead of the tire.

Likewise, once the outer bead 12 has been lifted, the operator inserts the lever 1 between the tool 11 and the raised bead 12 to reach an unexposed region, i.e., the region between the inner rim 17 of the wheel 14 and the inner bead 18 of the tire 13. The curvature of the lever 1 facilitates this task, since by inserting said lever substantially axially with respect to the wheel through the rim 16 and the bead 12, it is easily located between the inner bead 18 and the rim 17, since the tip 3 substantially lies on the line that connects the two rims of the wheel without having to perform a plurality of blind attempts and in any case with no risk of damaging the tire, in view of the presence of the expansion 4 or 9 and 10. Once the inner bead 18 has been engaged on the outside, the lever 1 is made to slide on the tool 11 so as to lift the tire above the outer rim 16 and the lever is overturned against the outer face of the wheel—see FIG. 7—to lift the inner bead 18 as well, without affecting the wheel 14.

The above-described bead lifting lever is susceptible of numerous modifications and variations which are all within the protective scope defined by the content of the appended claims.

Thus, for example, instead of the tapered tip 5, or instead of the expanded tip 4, it is possible to provide a maneuvering handgrip, for example of a conventional type, optionally covered with adapted wearproof material.

The materials and the dimensions may be various according to the requirements.

What is claimed is:

1. A tire bead breaking lever comprising a curved body provided with a working curved tip and a curved handling tip, wherein said working tip is provided with a rounded and expanded edge having a flat surface continuing a concave inner surface of said curved body, and a laterally radiused convex surface on a side opposite to that of said flat surface, said working and handling tips being curved in an opposite direction with respect to a curving direction of said body.

2. A tire bead breaking lever according to claim 1, wherein said handling tip is provided with a profile that tapers towards its end.

3. A tire bead breaking lever according to claim 1, wherein said curved body has a flat cross section with rounded edges.

4. A tire bead breaking lever according to claim 1, wherein said curved body has a chamber of 15 to 30 mm.

5. A tire bead breaking lever according to claim 1, wherein said curved handling tip is provided with a maneuvering handgrip.

6. A tire bead breaking lever according to claim 1, wherein the edge of said working tip is a simple rounded expansion.

7. A tire bead breaking lever according to claim 1, wherein said working tip is provided with a pair of expansions.

* * * * *